March 17, 1942.                E. A. CHRISTOPH                2,276,928
                              CUTTING TOOL AND HOLDER
                                Filed May 11, 1939
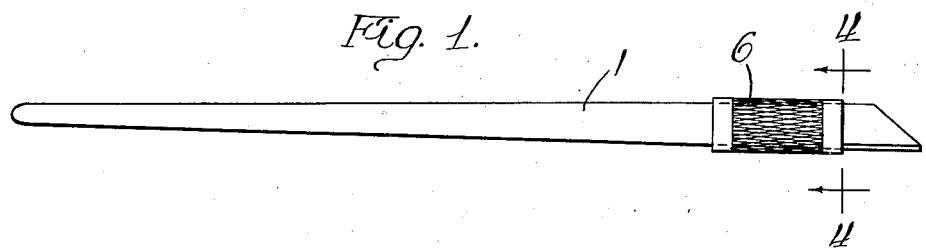
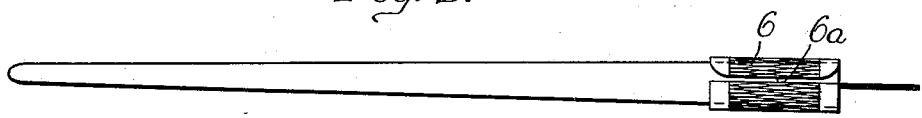
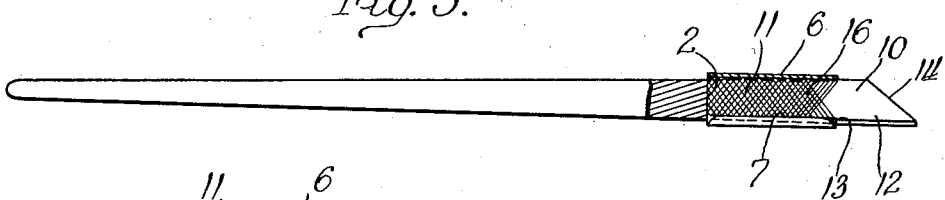
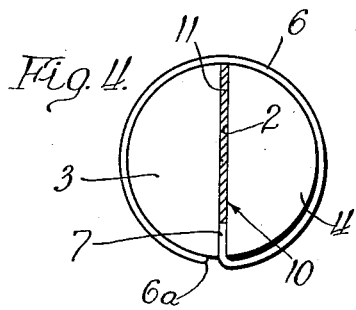
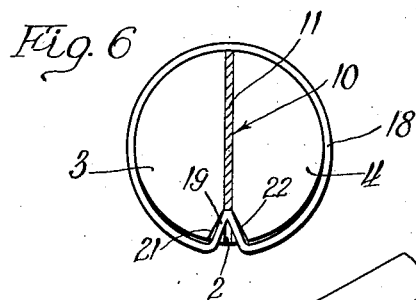
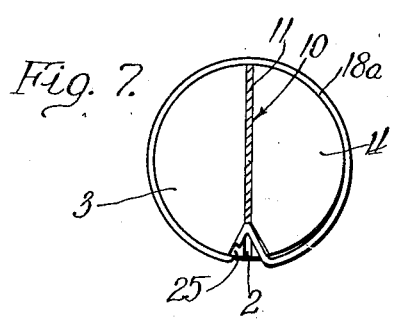
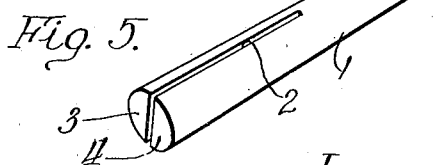
Inventor:
Edward A. Christoph
By Brown, Jackson, Boettcher & Dienner
Attys Patented Mar. 17, 1942

2,276,928

UNITED STATES PATENT OFFICE 2,276,928

CUTTING TOOL AND HOLDER

Edward A. Christoph, Chicago, Ill.

Application May 11, 1939, Serial No. 272,977

3 Claims. (Cl. 30—336)

This invention relates to tools, and more particularly to hand tools of the edged variety or the like. More particularly, the present invention is concerned with tools of this kind having short removable blades and used by artists, model builders, and other craftsmen.

The object and general nature of this invention is the provision of a tool of this class in which the blades can be easily and quickly removed or inserted, as the case may be, and in which the blade is firmly attached to the handle and held against any inadvertent movement relative to or loosening in the handle. More specifically, it is a feature of this invention to provide a handle having a slot and a ferrule surrounding the slot and arranged to grip the edges of the blade when the latter is forced into the slot. Preferably, the ferrule grips the edges of the blade shank and, at the same time, forces the sides of the handle laterally into firm gripping engagement with the sides of the blade shank. Gripping the shank from four directions thus provides a very secure attachment of the blade to the handle.

A further feature of this invention resides in the provision of a tapered handle so that when an effort is made to shift the ferrule and blade longitudinally of the handle in one direction, the ferrule grips the handle sides so as to force them even more tightly against the sides of the blade shank. Also, it is a feature of this invention to provide a blade in which the shank is roughened, thereby increasing the grip of the handle on the blade shank but without detracting from the grip of the ferrule on the edges of the blade shank. Another feature of this invention is the provision of a resilient or spring ferrule arranged to grip the blade when the latter is disposed in the slotted portion of the handle, irrespective of small variations in the size of the handle or blade.

These and other objects and advantages of my invention will be apparent to those skilled in the art after a consideration of the following detailed description, taken in conjunction with the accompanying drawing illustrating the preferred structural embodiments of the invention.

In the drawing:

Figure 1 is a side elevation of a knife embodying the principles of the present invention;

Figure 2 is a view of the knife shown in Figure 1, looking toward the cutting edge of the blade;

Figure 3 is a view similar to Figure 1 but showing certain parts in section;

Figure 4 is a sectional view taken along the line 4—4 of Figure 1;

Figure 5 is a fragmentary perspective view of the large or slotted end of the handle; and Figures 6 and 7 are views similar to Figure 4 but showing modifications of this invention.

Referring now more particularly to Figures 1 to 4, inclusive, the handle 1 may be of any suitable form and at one end is provided with a central axial slot 2 which divides the large end of the handle 1 into two opposite sections 3 and 4 which are generally semicircular, as best shown in Figure 5. If desired, the handle may be tapered with the slot 2 formed in the large end, as shown, but it is to be understood that this is not essential. When the handle is to be printed, as with advertising matter, the handle, or the portion thereof receiving the printing, is preferably not tapered.

A ferrule 6 is adapted to be disposed about the slotted end of the handle and comprises a split ring or cylinder formed of any suitable material, preferably but not necessarily of steel or other suitable metal. A flange or rib 7, made by bending one edge of the strip substantially at right angles, as best shown in Figure 4, extends generally radially inwardly into the slot and has a thickness substantially the same as the width of the slot. The member 6 is disposed about the slotted end of the handle 1 and the other end of the strip, indicated at 6a in Figure 4, terminates adjacent to but spaced slightly from the rib 7, as best shown in Figures 2 and 4.

A blade 10, having the general formation indicated at Figure 3, is provided with a shank 11 and a cutting edge 12. The shank 11 is slightly narrower than the portion of the blade having the cutting edge 12, and this forms a shoulder on the blade, as indicated in Figure 3 by the reference numeral 13. The back of the blade is cut on a slope, as indicated at 14, but the blades may have any shape desired. The opposite sides of the shank 11 are roughened, as indicated at 16, for a purpose which will appear below.

The knife is assembled in the following manner:

The ferrule 6 is first forced onto the slotted end of the handle 1. Since the member 6 is split, as at 6a (Figure 4), it will be seen that the member 6 exerts a bias tending to force the sections 3 and 4 of the handle toward one another. The ferrule 6 is placed on the handle by inserting the rib or flange 7 into the slot 2, this being the position of the ferrule shown in Figures 2 and 3. The blade 10 is then inserted by forcing the shank 11 into the slot 2. Preferably, the blade is held by a pair of pliers for this purpose. The width of the shank 11 is slightly greater than the distance from the edge of the rib or flange 7 to the opposite portion of the ferrule, so that forcing the blade into the slot 2 with the ferrule 6 in place about the slotted end of the handle causes the ferrule to grip the opposite edges of the blade shank, and at the same time the forcing of the blade into the slot 2 tends to spread the sections 3 and 4 slightly, thereby further tightening the grip of the ferrule 6 on the handle, which is made more effective by the roughened blade shank. The blade may be positioned in the handle in any suitable manner, as will be obvious. If desired, the shank of the blade may be inserted into slot 2, with the ferrule or sleeve 6 disposed beyond the slotted portion of the handle and sleeve 6 then moved into position about the slotted end portion of the handle, effective for securing the blade in the manner stated.

Thus the blade 10 is firmly locked to the handle from four directions. The ferrule itself bears against the opposite edges of the blade shank, as above explained, and the ferrule sides engaging the sides 3 and 4 of the handle cause the latter to be forced against the sides of the blade shank. To remove a blade it is only necessary to grasp the ferrule 6, grip the blade 10, as with a pair of pliers, and forcibly extract the blade. A new blade may then be inserted in the manner above described.

As stated above, the slotted end of the handle may be tapered, in which case the ferrule is first applied to the handle with the inner end of the flange 7 engaging the bottom of the slot. Then after the blade 10 is inserted as described above, the ferrule and blade are shifted forwardly a slight amount, the blade and ferrule moving together, since the shoulder 13 engages one end of the flange 7 when the blade is inserted. If the slotted portion of the handle 1 is tapered, this slight outward movement of the ferrule and blade serves to force handle sections 3 and 4 laterally inwardly toward one another with a wedging action, causing them to engage the roughened side portions 16 of blade 10.

If desired, the ferrule 6 may be tapered to substantially the same degree as the handle 1, or it may be made generally cylindrical, the yielding of the ferrule 6 permitting it to accommodate the degree of taper of the handle. The shank 11 may or may not be tapered, as desired.

The ferrule 6 is not necessarily limited to a split ring or sleeve in order to secure the desired clamping action. As shown in Figure 6, the ferrule 18 is in the form of a generally tubular sleeve with a flange or rib 19 formed therein and generally V-shaped in section. The edge or radially innermost portion of the flange or rib 19 engages one edge of the blade shank 11, and to accommodate the rib 19, the handle sections 3 and 4 are cut out to form a groove, the side walls of which are shown at 21 and 22. The sleeve or ferrule 18 is formed of any suitable material, preferably having some spring or resiliency, and shaped so that it has the required gripping of the opposite edges of the blade shank 11 when the latter is forced into position therein in the manner described above. It will also be seen that, as to the form shown in Figure 6, when the shank 11 of the blade 10 is forced into the member 18, there is a tendency for the sides of the member 18 between the rib 19 and the opposite section to straighten out, thus forcing the handle sections 3 and 4 inwardly tightly against the sides of the blade shank 11, even without moving the sleeve 18 slightly outwardly on the tapered handle end. This action also takes place in the construction shown in Figure 4, in that the section 4 tends to be forced laterally inwardly against one side of the blade shank when the latter is forced into place.

Figure 7 shows substantially the same construction as indicated in Figure 6 except that the sleeve, indicated at 18a, is not continuous but is split at 25.

From the description above of the preferred means in which the principles of the present invention have been embodied, it will be apparent that I have provided a tool in which the blade can be inserted or removed easily and conveniently, and that when the blade is in place it is safely and firmly gripped in such manner that it cannot be moved or displaced out of position inadvertently, but is securely held to the handle without any screw threaded connections or other complicated mechanisms.

It will be understood that my invention is not to be limited to the specific details shown and described above, but that, in fact, widely different means may be employed in the practice of the broader aspects of my invention.

What I claim, therefore, and desire to secure by Letters Patent, is:

1. In a knife, a handle having a slot at one end, said handle being tapered at the slotted end, a ferrule disposed about said slotted end of the handle, a blade having a shank adapted to be forced into said slot after the ferrule has been disposed about the slotted portion of the handle, said ferrule having portions resiliently engaging opposite edges of said shank so as to hold said shank and ferrule against relative movement, outward movement of the ferrule and blade relative to the tapered portion of the handle serving to cause the ferrule to force the portions of the handle on opposite sides of the slot into firm gripping engagement with the sides of said shank.

2. A tool comprising a handle having one end provided with a central slot and a generally V-shaped groove extending along one edge of the slot, a ferrule comprising a generally cylindrical member encircling the slotted portion of said handle and having a rib disposed in said groove, and a blade having a shank adapted to be forced into said slot between the inner portion of said rib and the opposite portion of said ferrule, whereby the blade is firmly gripped by said ferrule, the sides of the latter gripping the sides of the handle so as to retain the ferrule and the blade in position on the handle.

3. A tool comprising, a handle provided at one end with a transverse parallel slot opening at its sides through the sides of said handle, a blade having a shank portion disposed in said slot parallel with the slotted end portion of said handle, and a resilient sleeve fitting about the slotted end portion of said handle and contractible thereabout by its inherent resiliency effective for forcing the elements of said handle at the sides of said slot into clamping contact with said shank, the opposite edges of the latter contacting said sleeve and cooperating therewith for confining said blade against movement in the plane of said slot.

EDWARD A. CHRISTOPH.